US008663009B1

(12) United States Patent
Pacey et al.

(10) Patent No.: US 8,663,009 B1
(45) Date of Patent: Mar. 4, 2014

(54) ROTATABLE GAMING DISPLAY INTERFACES AND GAMING TERMINALS WITH A ROTATABLE DISPLAY INTERFACE

(71) Applicant: WMS Gaming Inc., Waukegan, IL (US)

(72) Inventors: Larry J. Pacey, Chicago, IL (US); Scott A. Massing, Lincolnwood, IL (US); Matthew J. Ward, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 13/778,389

(22) Filed: Feb. 27, 2013

Related U.S. Application Data

(60) Provisional application No. 61/701,929, filed on Sep. 17, 2012.

(51) Int. Cl.
*A63F 9/24* (2006.01)
*A63F 13/00* (2006.01)
*G06F 17/00* (2006.01)
*G06F 19/00* (2011.01)

(52) U.S. Cl.
USPC ................... 463/37; 463/16; 463/30; 463/36; 463/47

(58) Field of Classification Search
USPC ................... 463/1, 16–20, 25, 29–31, 36, 37, 463/40–42, 46, 47; 345/156
See application file for complete search history.

(56) References Cited

U.S. PATENT DOCUMENTS

| | | | | |
|---|---|---|---|---|
| 5,758,875 | A * | 6/1998 | Giacalone, Jr. | 273/143 R |
| 6,348,905 | B1 | 2/2002 | Wang | 345/31 |
| 6,517,433 | B2 | 2/2003 | Loose et al. | 463/20 |
| 6,722,979 | B2 | 4/2004 | Gilmore et al. | 463/20 |
| 6,937,298 | B2 | 8/2005 | Okada | 349/58 |
| 6,942,574 | B1 | 9/2005 | LeMay et al. | 463/41 |
| 7,097,560 | B2 | 8/2006 | Okada | 463/20 |
| 7,140,963 | B2 | 11/2006 | Kojima | 463/20 |
| 7,159,865 | B2 | 1/2007 | Okada | 273/143 R |
| 7,160,187 | B2 | 1/2007 | Loose et al. | 463/20 |
| 7,169,048 | B2 | 1/2007 | Nozaki et al. | 463/30 |
| 7,207,883 | B2 | 4/2007 | Nozaki et al. | 463/24 |
| 7,219,893 | B2 | 5/2007 | Tanimura et al. | 273/143 |
| 7,220,181 | B2 | 5/2007 | Okada | 463/32 |
| 7,234,697 | B2 | 6/2007 | Okada | 273/143 R |
| 7,281,980 | B2 | 10/2007 | Okada et al. | 463/20 |
| 7,322,884 | B2 | 1/2008 | Emori et al. | 463/16 |

(Continued)

FOREIGN PATENT DOCUMENTS

| | | | |
|---|---|---|---|
| WO | 2006/039323 | 4/2006 | |
| WO | 2007/089410 | 8/2007 | A63F 9/24 |

*Primary Examiner* — Milap Shah
(74) *Attorney, Agent, or Firm* — Nixon Peabody LLP

(57) ABSTRACT

Gaming devices, gaming systems, and gaming display assemblies are presented herein. A gaming machine for playing a wagering game is disclosed. The gaming machine includes a support structure and an input device configured to receive an input indicative of a wager to play the wagering game. A primary display device is mounted to the support structure and configured to display randomly determined outcomes of the wagering game. A display interface device, which overlies at least a portion of the primary display device, includes a player-rotatable display interface rotatably mounted to the support structure and configured to be manually rotated by a player. The display interface device is operatively connected to the primary display device such that motion manually imparted to the player-rotatable display interface by a player affects one or more aspects of the wagering game displayed on the primary display device.

22 Claims, 7 Drawing Sheets

(56) References Cited

U.S. PATENT DOCUMENTS

| | | | | |
|---|---|---|---|---|
| 7,329,181 | B2 | 2/2008 | Hoshino et al. | 463/20 |
| 7,355,660 | B2 | 4/2008 | Ikeda | 349/60 |
| 7,390,259 | B2 | 6/2008 | Okada | 463/20 |
| 7,404,766 | B2 | 7/2008 | Adachi et al. | 463/31 |
| 7,458,890 | B2 | 12/2008 | Loose et al. | 463/16 |
| 7,465,228 | B2 | 12/2008 | Okada | 463/20 |
| 7,479,061 | B2 | 1/2009 | Okada | 463/20 |
| 7,479,065 | B1 | 1/2009 | McAllister et al. | 463/37 |
| 7,479,066 | B2 | 1/2009 | Emori | 463/46 |
| 7,485,039 | B2 | 2/2009 | Okada | 463/20 |
| 7,510,475 | B2 | 3/2009 | Loose et al. | 463/31 |
| 7,510,476 | B2 | 3/2009 | Kobayashi | 463/31 |
| 7,520,812 | B2 | 4/2009 | Okada | 463/31 |
| 7,585,220 | B2 | 9/2009 | Loose et al. | 463/20 |
| 7,594,852 | B2 | 9/2009 | Rasmussen | 463/20 |
| 7,618,323 | B2 | 11/2009 | Rothschild et al. | 463/37 |
| 7,695,364 | B2 | 4/2010 | Okada | 463/20 |
| 7,708,640 | B2 * | 5/2010 | Burak et al. | 463/30 |
| 7,789,756 | B2 | 9/2010 | Jones et al. | 463/37 |
| 7,841,944 | B2 | 11/2010 | Wells | 463/37 |
| 7,942,417 | B2 * | 5/2011 | Smith | 273/143 R |
| 7,942,745 | B2 | 5/2011 | Ikeda et al. | 463/38 |
| 7,972,212 | B2 | 7/2011 | Iverson et al. | 463/37 |
| 8,057,305 | B2 | 11/2011 | Iverson et al. | 463/37 |
| 8,062,115 | B2 | 11/2011 | Thomas et al. | 463/16 |
| 8,075,384 | B2 | 12/2011 | Jones et al. | 463/16 |
| 8,109,825 | B2 | 2/2012 | McAllister et al. | 463/20 |
| 8,128,477 | B2 * | 3/2012 | Durham et al. | 463/17 |
| 8,147,316 | B2 | 4/2012 | Arezina et al. | 463/20 |
| 8,382,110 | B2 * | 2/2013 | Smith | 273/143 R |
| 8,403,743 | B2 * | 3/2013 | Pacey et al. | 463/20 |
| 2003/0157980 | A1 * | 8/2003 | Loose et al. | 463/20 |
| 2004/0102241 | A1 | 5/2004 | Kaminkow | 463/20 |
| 2004/0166930 | A1 * | 8/2004 | Beaulieu et al. | 463/25 |
| 2005/0054440 | A1 | 3/2005 | Anderson et al. | |
| 2005/0164785 | A1 | 7/2005 | Connelly | |
| 2005/0164786 | A1 | 7/2005 | Connelly | |
| 2005/0164787 | A1 | 7/2005 | Connelly | |
| 2005/0164788 | A1 | 7/2005 | Grabiec | |
| 2005/0233799 | A1 | 10/2005 | LeMay et al. | 463/20 |
| 2005/0277469 | A1 | 12/2005 | Pryzby et al. | |
| 2005/0282631 | A1 | 12/2005 | Bonney et al. | |
| 2006/0009285 | A1 | 1/2006 | Pryzby et al. | |
| 2006/0046818 | A1 * | 3/2006 | Goins | 463/16 |
| 2006/0046829 | A1 | 3/2006 | White | |
| 2006/0052152 | A1 * | 3/2006 | Tedsen et al. | 463/16 |
| 2006/0199638 | A1 | 9/2006 | Walker et al. | 463/30 |
| 2007/0019181 | A1 | 1/2007 | Sinclair et al. | 356/4.01 |
| 2007/0149281 | A1 * | 6/2007 | Gadda et al. | 463/34 |
| 2007/0293304 | A1 | 12/2007 | Loose et al. | |
| 2008/0040692 | A1 | 2/2008 | Sunday et al. | 715/863 |
| 2008/0161108 | A1 | 7/2008 | Dahl et al. | |
| 2009/0170597 | A1 | 7/2009 | Bone et al. | |
| 2009/0298579 | A1 | 12/2009 | Radek et al. | |
| 2009/0312095 | A1 * | 12/2009 | Durham et al. | 463/30 |
| 2010/0029385 | A1 | 2/2010 | Garvey et al. | |
| 2010/0069160 | A1 | 3/2010 | Barrett et al. | 463/46 |
| 2010/0151945 | A2 | 6/2010 | Booney et al. | |
| 2010/0234094 | A1 * | 9/2010 | Gagner et al. | 463/20 |
| 2010/0234099 | A1 | 9/2010 | Rasmussen et al. | 463/29 |
| 2010/0261523 | A1 | 10/2010 | Bonney et al. | |
| 2011/0165932 | A1 | 7/2011 | Rommerdahl et al. | 463/17 |

* cited by examiner

ROTATABLE GAMING DISPLAY INTERFACES AND GAMING TERMINALS WITH A ROTATABLE DISPLAY INTERFACE

CLAIM OF PRIORITY AND CROSS-REFERENCE TO RELATED APPLICATION

This application claims the benefit of and priority to U.S. Provisional Patent Application No. 61/701,929, which was filed on Sep. 17, 2012, and is incorporated herein by reference in its entirety.

COPYRIGHT

A portion of the disclosure of this patent document contains material which is subject to copyright protection. The copyright owner has no objection to the facsimile reproduction by anyone of the patent disclosure as it appears in the U.S. Patent and Trademark Office patent files or records, but otherwise reserves all copyright rights whatsoever.

TECHNICAL FIELD

The present disclosure relates generally to wagering games, as well as wagering game terminals and wagering game systems. More particularly, the present disclosure relates to interactive gaming display assemblies and gaming terminals with interactive display assemblies.

BACKGROUND

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Thus, gaming manufacturers continuously strive to develop new games and improved gaming enhancements that will attract frequent play and increased player loyalty through enhanced entertainment value to the player.

There are three primary types of wagering game machines: mechanical, electromechanical, and electronic. The original slot machine, for example, was entirely mechanical in construction, working on an elaborate configuration of springs, gears, shafts, brakes and levers. Since its introduction in the early 1960's, the electromechanical slot machine began replacing most, if not all, mechanical slot machines. Electromechanical gaming machines typically use one or more microprocessors to determine a random outcome for each play of the slot game, and electrical stepper motors to spin and stop a set of mechanical reels to reveal the outcome. The electronic gaming machine (EGM), in comparison, subsequently supplanted the mechanical reels of the electromechanical gaming machine with simulated mechanical reels generated by a video display device. In addition to slot-type wagering games, traditional table games, such as poker, blackjack, keno, and bingo, were adapted for use on EGM's.

Almost all gaming machines, whether mechanical, electromechanical or electronic, include a variety of visual attractions and displays to provide information, enhance game play, and improve the player's gaming experience. These visual attractions and displays typically include models, signs, artwork, fixed permanently-printed glass, video displays, and marquee assemblies. Many gaming machines are limited to a dedicated "primary" display and, in some instances, a top-box mounted "secondary" display or a top-box mounted marquee assembly. In most configurations, the gaming terminal's various video display devices are immovably mounted to the cabinet in a fixed location. Moreover, electronic video display devices have been limited to traditional cathode ray tube (CRT) displays, liquid crystal display (LCD) panels, plasma display panels, flat-screen transmissive LCD assemblies, and light emitting diode (LED) display panels, which are substantially flat, rigid and inflexible. These display assemblies offer limited interactive capabilities to players, normally being restricted to receiving inputs via an integrated touchscreen device. There may therefore be a need for more interactive gaming display devices that are not limited to these traditional types of display assemblies.

SUMMARY

Aspects of the present disclosure are directed to rotatable gaming display interfaces and gaming terminals with a rotatable display interface. Disclosed herein, for example, are interactive gaming display assemblies with a rotatable interface that overlies a primary "game" display device. The rotatable display interface is intended, in at least some aspects of the disclosed concepts, to offer to players a more realistic sense of controlling the gaming machine hardware by mapping aspects of the wagering game displayed by the primary display device to the motion imparted to the rotatable display interface by the player. As an example, the spinning of one or more symbol-bearing slot reels may be timed to coincide with the rotation of the display interface, such rotation being generated by the player physically touching and spinning the rotatable display interface. In the same vein, the player may then selectively stop (or be given the impression of stopping) one or more of the reels by manually stopping the rotation of the rotatable display interface. In addition to the basic game, aspects of bonus games, progressive games, and community games can be mapped to the rotation of the player-rotatable game display interface.

The primary display device may take on various forms, including standard mechanical slot reels, commercially available flat-screen video display panels, and curved LCD or OLED video display devices, as some non-limiting examples. The rotatable display interface may be fabricated in an assortment of different shapes from a number of different materials. As one example, the rotatable display interface may be a rotatably mounted disk, cylindrical tube, or group of rings fabricated from a polycarbonate resin thermoplastic polymer (e.g., LEXAN™ polymers available from SABIC Innovative Plastics). An optional touchscreen can be incorporated into the display assembly to receive player inputs. The touchscreen can be mounted on the primary display device, between the primary display device and the rotatable display interface, or on the rotatable display interface such that player input's can be received by the display assembly on or through the manually rotatable display interface.

According to one aspect of the present disclosure, a gaming machine for playing a wagering game is disclosed. The gaming machine includes a support structure, an input device configured to receive an input indicative of a wager to play the wagering game, and a primary display device configured to display randomly determined outcomes of the wagering game. The gaming machine also includes a display interface device overlying at least a portion of the primary display device. The display interface device includes a player-rotatable display interface that is rotatably mounted to the support structure and configured to be manually rotated by a player. The display interface device is operatively connected to the primary display device such that motion manually imparted to the player-rotatable display interface by a player affects one or more aspects of the wagering game displayed on the primary display device.

In accordance with another aspect of the disclosure, a gaming system for playing a wagering game is presented. The gaming system includes one or more input devices, one or more processors, one or more memory devices, and a support structure. The gaming system also includes a primary display device mounted to the support structure and configured to display randomly determined outcomes of the wagering game. A display interface device overlies at least a portion of the primary display device. The display interface device includes a player-rotatable display interface that is rotatably mounted to the support structure and configured to be manually rotated by a player. The display interface device is operatively connected to the primary display device such that motion manually imparted to the player-rotatable display interface by a player affects one or more aspects of the wagering game displayed on the primary display device.

Other aspects of the present disclosure are directed to a gaming display assembly. The gaming display assembly includes a mounting support with a primary display device mounted to the mounting support. The primary display device is configured to display randomly determined outcomes of the wagering game. A display interface device overlies at least a portion of the primary display device. The display interface device includes a player-rotatable display interface that is rotatably mounted to the mounting support and configured to be manually rotated by a player. The display interface device is operatively connected to the primary display device such that motion manually imparted to the player-rotatable display interface by a player affects one or more aspects of the wagering game displayed by the primary display device.

Another aspect of this disclosure is directed to a wagering game terminal. The wagering game terminal includes a cabinet with support structure, and an input device configured to receive an indication of a wager to play a wagering game. A curved liquid crystal display (LCD) video display device or a curved organic light emitting diode (OLED) video display device is mounted to the support structure of the cabinet. The curved video display device is configured to display a plurality of symbol-bearing reels with symbols arranged in an array to indicate a randomly determined outcome of the wagering game. The wagering game terminal also includes a display interface device with a player-rotatable display interface. The player-rotatable display interface includes a cylindrical tube that is rotatably mounted to the support structure of the cabinet and configured to be manually rotated by a player. The curved video display device is mounted inside the cylindrical tube. The display interface device is operatively connected to the primary display device such that motion manually imparted to the cylindrical tube by a player affects the movement of one or more of the symbol-bearing reels displayed by the curved video display device.

The above summary is not intended to represent each embodiment or every aspect of the present disclosure. Rather, the summary merely provides an exemplification of some of the novel features presented herein. The above features and advantages, and other features and advantages of the present disclosure, will be readily apparent from the following detailed description of exemplary embodiments and modes for carrying out the present invention when taken in connection with the accompanying drawings and the appended claims.

Figure 1:
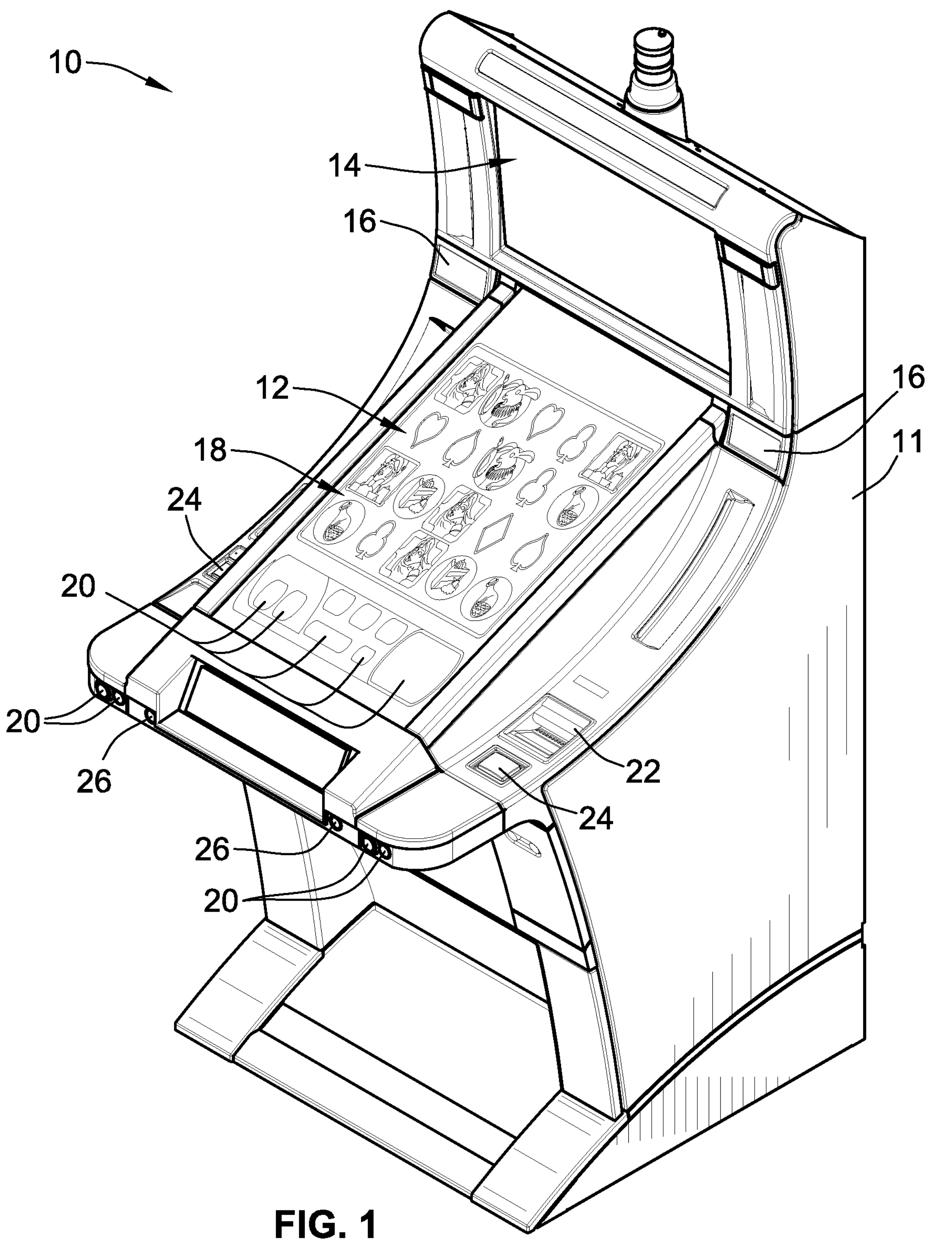
FIG. 1 is a perspective-view illustration of an exemplary free-standing gaming terminal according to aspects of the present disclosure.

While aspects of this disclosure are susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

This invention is susceptible of embodiment in many different forms. There are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Abstract, Summary, and Detailed Description sections, but not explicitly set forth in the claims, should not be incorporated into the claims, singly or collectively, by implication, inference or otherwise. For purposes of the present detailed description, unless specifically disclaimed: the singular includes the plural and vice versa; the words "and" and "or" shall be both conjunctive and disjunctive; the word "all"

means “any and all”; the word “any” means “any and all”; and the word “including” means “including without limitation.” Moreover, words of approximation, such as “about,” “almost,” “substantially,” “approximately,” and the like, can be used herein in the sense of “at, near, or nearly at,” or “within 3-5% of,” or “within acceptable manufacturing tolerances,” or any logical combination thereof, for example.

For purposes of the present detailed description, the terms “wagering games,” “gambling,” “slot game,” “casino game,” and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Referring to the drawings, wherein like reference numerals refer to like features throughout the several views, there is shown in FIG. 1 a representative gaming terminal 10 similar to those used in gaming establishments, such as casinos, hotels and cruise ships, and non-conventional gaming establishments, such as airports and restaurants. With regard to the present disclosure, the gaming terminal 10 (used herein interchangeably with “gaming machine” and “gaming device”) may be any type of wagering game device and may have varying structures and methods of operation. For example, in some aspects, the gaming terminal 10 is an electromechanical gaming terminal configured to play slots with mechanical reels, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models (as shown), handheld mobile devices, bartop models, workstation-type console models, personal computing devices, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433, U.S. Patent Application Publication Nos. 2010/0069160 and 2010/0234099, and International Application No. PCT/US2007/000792, all of which are incorporated herein by reference in their respective entireties for all purposes.

The gaming terminal 10 illustrated in FIG. 1 comprises a cabinet 11 that may house various input devices, output devices, and input/output devices. By way of non-limiting example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display may be disposed in front of the mechanical-reel display to portray a video image superimposed upon the mechanical-reel display. The display areas may variously display information associated with wagering games, non-wagering games, community games, progressive games, advertisements, services, premium entertainment, text messaging, emails, alerts, announcements, broadcast information, subscription information, etc., appropriate to the particular mode(s) of operation of the gaming terminal 10. The gaming terminal 10 includes a touchscreen(s) 18 mounted over the primary and/or secondary areas 12, 14, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a “Max Bet” button or soft key to indicate a player's desire to place a maximum wager to play the wagering game). The input(s), once transformed into electronic data signals, are output to a CPU for processing. The electronic data signals can be selected from a group consisting essentially of an electrical current, an electrical voltage, an electrical charge, an optical signal, an optical element, a magnetic signal, and a magnetic element.

Figure 2:
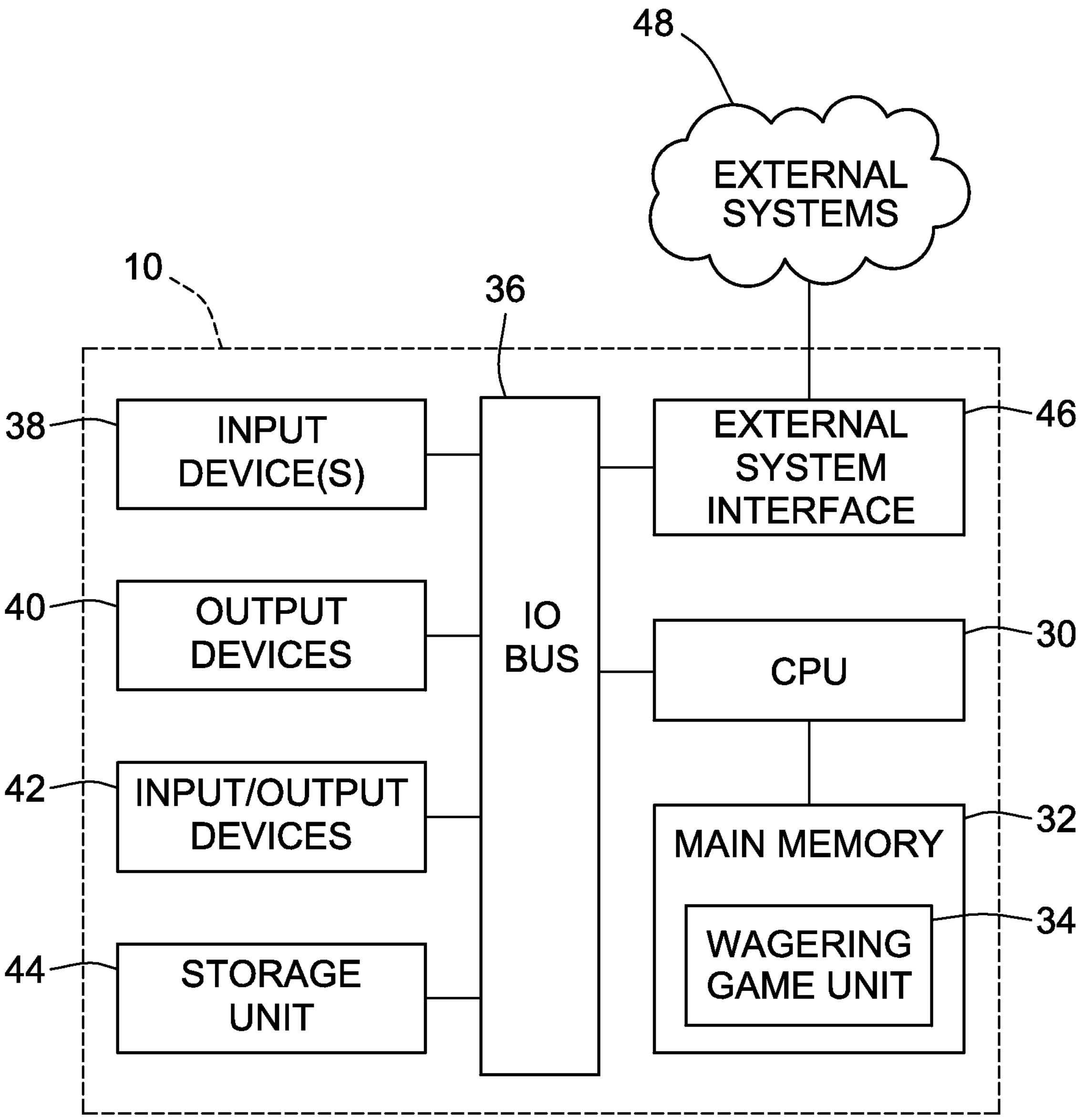
FIG. 2 is a schematic diagram of an example of a gaming system according to aspects of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks). In some embodiments, storage unit 44 stores performance data and/or configuration data.

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes a random number generator (RNG) for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
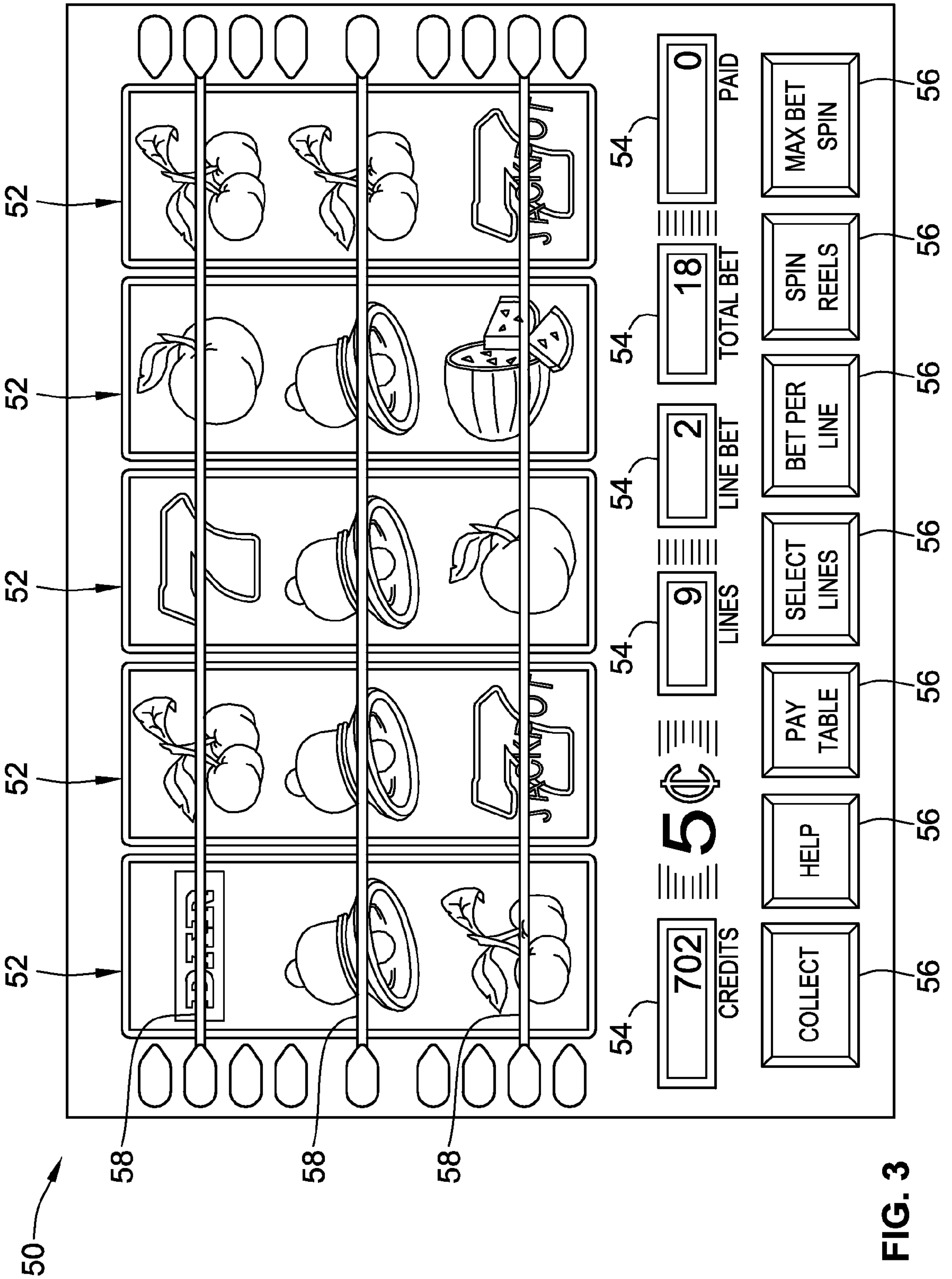
FIG. 3 is a screen shot of a representative basic-game screen of a wagering game displayed on a gaming terminal, gaming device, and/or gaming system according to aspects of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by an RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
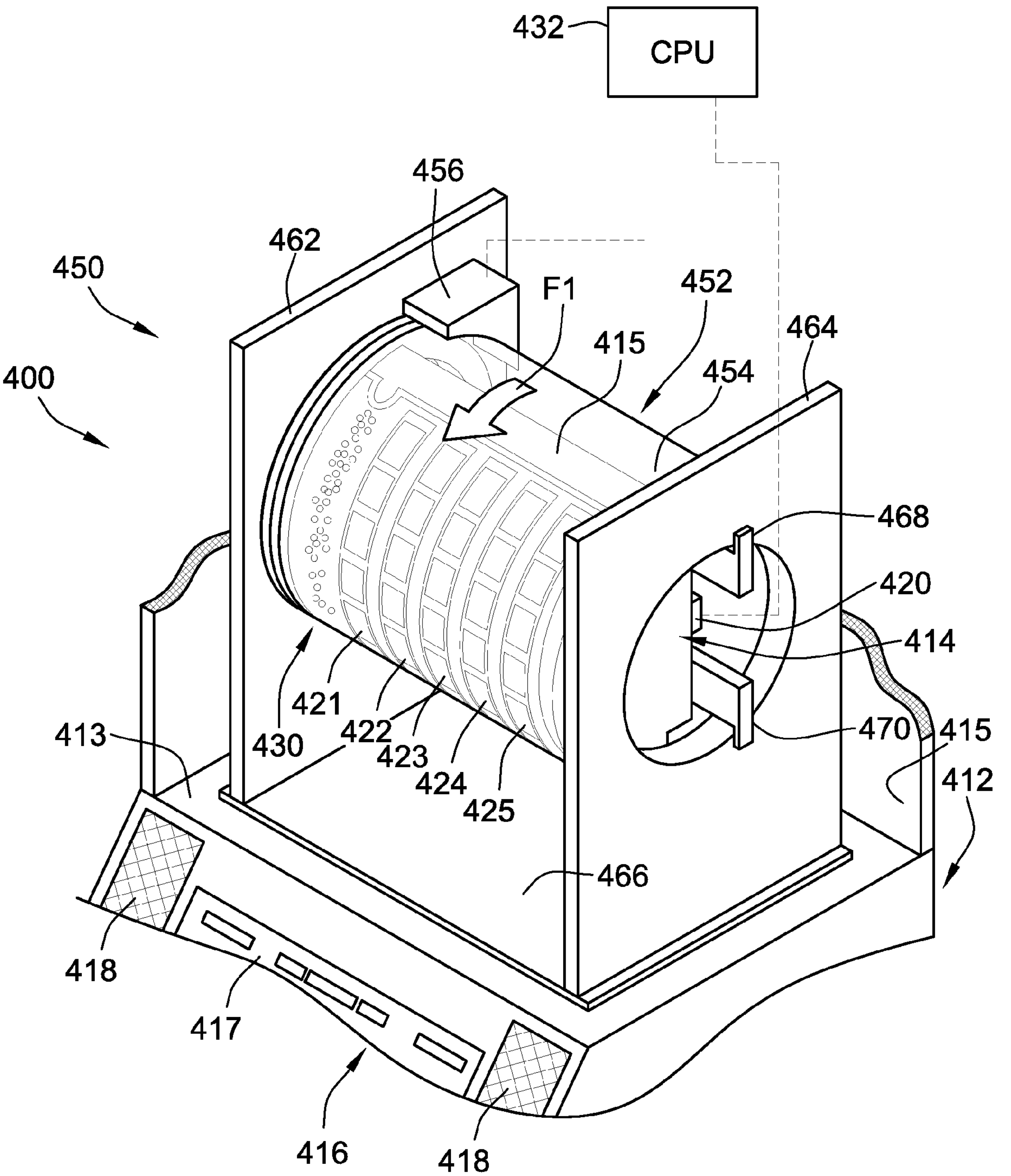
FIG. 4 is a front perspective-view illustration of a gaming display assembly with a player-rotatable display interface overlying a primary display device in accordance with aspects of the present disclosure.

Referring now to FIG. 4, a front perspective-view illustration of an exemplary gaming terminal for playing one or more wagering games is shown at 400. Although differing in appearance, the gaming terminal 400 can take on any of the various forms, optional configurations, and functional alternatives described herein and, thus, can be similar in function and connectivity to the gaming terminal 10 discussed above with respect to FIGS. 1 and 2. For example, the gaming terminal 400 (also referred to herein as "gaming device" or "gaming machine") may be an electromechanical gaming machine configured, for example, to play mechanical slots, or it may be an electronic gaming machine (EGM) configured, for example, to play a video casino game, such as keno, poker, slots, blackjack, roulette, etc. Markedly, the gaming terminal 400 is purely representative in nature and presented solely for explanatory purposes. As such, the inventive aspects of the present disclosure are not per se limited to the terminal configuration shown in FIG. 4.

The illustrated gaming terminal 400 comprises a cabinet 412 for housing and/or supporting a variety of operational componentry, such as the player-input device(s) 26, main memory 32, an input/output (I/O) bus 36, output devices 40, CPU 42, memory 44, and external systems interface 58 of FIG. 2. For output devices, the gaming terminal 400 includes a first ("primary") display area or device 414, a second ("secondary") display area or device 416, and one or more audio speakers 418, as some non-limiting examples. For input devices, the gaming terminal 400 includes a first touchscreen 415 mounted over the primary display device 414 and a second touchscreen 417 mounted over the secondary display device 416. Other optional input devices may include a bill receiving and validating device, a coin acceptor, one or more information readers, a button panel, and one or more player-accessible ports (e.g., an audio output jack for headphones, a video headset jack, a wireless transmitter/receiver, etc.). While these typical components found in the gaming terminal 400 are described above, it should be understood that numerous additional/alternative peripheral devices and other elements may exist and may be used in any number of combinations to create various forms of a gaming terminal.

The display areas may variously display information associated with base wagering games, bonus wagering games, community games, progressive games, and the like. As shown, primary display device 414 displays or otherwise visually depicts a wagering game 430, which in this instance is the slot game shown in FIG. 4. In the illustrated embodiment, for example, the primary display device 414 is a stationary curved video display device displaying a plurality of symbol-bearing reels, designated generally as 421-425, respectively, each having a plurality of distinct symbol positions filled with a variety of symbols. The curved video display device may take on various forms, including a curved liquid crystal display (LCD) device or a curved organic light emitting diode (OLED) display device. One such curved OLED display device is the curved super AMOLED display, which is commercially available from LG Display Co., Ltd., of Seoul, South Korea. The curved LCD display device, in contrast, may be a 22-inch curved thin film transistor (TFT) LCD monitor available from South Korean manufacturer Tovis Co., Ltd. Alternatively, the primary display device 414 may comprise electromechanical symbol-bearing reels, a traditional video display device, flat-panel electronic display devices, other known display devices, and combinations thereof.

The secondary display device 416 may display information associated with wagering games, non-wagering games, community games, progressive games, advertisements, services, premium entertainment, text messaging, emails, alerts or announcements, broadcast information, subscription information, etc. Like the primary display device 414, the secondary display device 416 of FIG. 4 may take on various forms, including a cathode ray tube (CRT), a high-resolution LCD display device, a light emitting diode (LED) display device, a plasma display device, a DLP projection display, an electroluminescent (EL) display panel, or any other type of display device suitable for use in the gaming terminal 400. According to the illustrated example, the secondary display device 416 is a high-resolution LCD panel 400. In some optional configurations, the secondary display device 416 may act purely as an input device through the integrated touchscreen 417, whereas some optional configurations may omit the secondary display device 416 altogether (e.g., being replaced by a button panel or other known input device(s)).

To provide a more interactive gaming experience to players, the gaming display assembly 450 of the gaming terminal 400 is provided with an interactive display interface device, generally designated as 452 in FIG. 4. The display interface device 452 includes a manually rotatable display interface 454 (also referred to herein as "player-rotatable display interface") which overlies at least a portion of the primary display device 414. As shown, the primary display device 414 is rigidly mounted inside the player-rotatable display interface 454 such that the display interface device 452 covers substantially all of the primary display device 414. The housing 412, a portion of which is shown partially cut away in FIG. 4, includes support structure 413 to which the player-rotatable display interface 452 is rotatably mounted. The support structure 413 may be an internal shelf of the housing 412, as can be seen in FIG. 4, or may be a rear mounting wall 415 or any other segment of the housing 412 with sufficient structural integrity to support the gaming display assembly 450. In accord with at least some of the disclosed concepts, the gaming display assembly 450 is at least partially, if not sufficiently enclosed within the housing 412 such that only a forward portion of the player-rotatable display interface 454 is exposed to and accessible by the player for manipulation thereof.

The interactive display interface device 452, in at least some aspects of the disclosed concepts, offers players the perception that they are controlling aspects of the wagering game 430. By mapping aspects of the wagering game 430 displayed by the primary display device 414 to the motion imparted to the player-rotatable display interface 454 by a player, the player can feel as though they are interacting with and/or controlling the game. In particular, the display interface device 452 is operatively connected, e.g., directly or indirectly, wired or wirelessly, to the primary display device 414 such that motion manually imparted to the player-rotatable display interface 454 affects one or more aspects of the wagering game 430 displayed on the primary display device 414. In a more specific example, movement of one or more of the symbol-bearing reels 421-425 displayed by the curved video display device 414, e.g., the spinning, stopping, acceleration, deceleration, speed, etc. of one or more of the reels 421-425, is affected by the player physically rotating the player-rotatable display interface 454. The symbols on the reels 421-425 are arranged in an array, which in this embodiment is a 5×5 matrix (i.e., five rows by five columns) of symbols. Spinning and stopping the reels 421-425 reveals combinations of symbols in the array, which represent randomly selected outcomes of the wagering game 430, that are evaluated for winning symbol combinations. As such, allowing the player to control, for example, the initiation of the spinning of the reels 421-425 and/or the stopping of the reels 421-425 through manipulation of the display interface 454 gives the player the perception or "feel" that they are controlling the outcome of the wagering game 430.

In some embodiments, the player will press a finger onto the display interface 454 and slowly rotate the display interface 454 up and down (e.g., clockwise and counterclockwise in FIG. 4); concurrently, the primary display device 414 will display the reels 421-425 slowly rotating up and down (e.g., clockwise and counterclockwise in FIG. 4) in sync with the display interface 454. At this point in time, however, the reels 421-425 are not displayed rotating in a full spin. When the player applies a final downward force to the player-rotatable display interface 454 (represented as F1 in FIG. 4) and subsequently releases the display interface 454 to spin freely, the primary display device 414 will simultaneously or substantially simultaneously display the reels 421-425 in full spin. An optional alternative to synchronously spinning all of the reels would be to allow the player to individually select one or more of the reels (e.g., via touchscreen 417 mounted on the secondary display device 416) to virtually isolate/select a reel such that spinning the manually rotatable display interface 454 would only spin the isolated reel.

On the rear side of the primary display device 414 is an electrical connector block 420, which may include a DVI digital monitor connector, a DVI-to-VGA connector, and an array of different Molex™ pin connectors, collectively providing power and signal transmission capabilities to the primary display device 414. The connector block 420 is communicatively coupled, for example, to a central processing unit 432, which may be similarly configured to CPU 30 of FIG. 2, which in turn receives output signals generated by a rotational sensing device 456. The rotational sensing device 456, which will be developed in more extensive detail below, tracks the rotational position, velocity and/or acceleration of the player-rotatable display interface 454. When the player-rotatable display interface 454 is manually rotated by a player, the rotational sensing device 456 generates signals indicative of the display interface's 454 movement, and outputs these signals to a central processing unit or a dedicated controller 432. The CPU/dedicated controller 432, in turn, conditions and processes the signals for contemporaneous mapping to preselected aspects of the wagering game 430. Instantaneously, or nearly instantaneously, in some preferred embodiments, command signals are transmitted from the CPU/dedicated controller 432 to the primary display device 414 to modify one or more aspects of the wagering game 430 displayed on the primary display device 414 based on the tracked motion of the rotatable display interface 454.

The manually rotatable display interface 454 may be fabricated from a number of different materials and provided in an assortment of different shapes, sizes and arrangements. In the representative embodiment of FIGS. 4 and 5, for example, the player-rotatable display interface 454 comprises a transparent or semi-transparent cylindrical tube, which may be fabricated from polycarbonate, acrylic, glass, acrylonitrile butadiene styrene (ABS) plastics, or any other rigid, optically transparent/semi-transparent materials. It is desirable, in at least some preferred embodiments, that the manually rotatable display interface 454 be a molded half-inch or quarter-inch thick cylinder composed of a polycarbonate resin thermoplastic polymer, such as LEXAN™ polymers available from SABIC Innovative Plastics of Saudi Arabia. Optionally, the player-rotatable display interface 454 may comprise a plurality of independently manipulable transparent or semi-transparent cylindrical tubes or rings (annuluses). These tubes/rings may be aligned side-by-side or in overlapping or partially-overlapping relation to one another. A plurality of independently spinable, axially aligned tubes/rings can enable more direct player control of each virtual reel.

Figure 5:
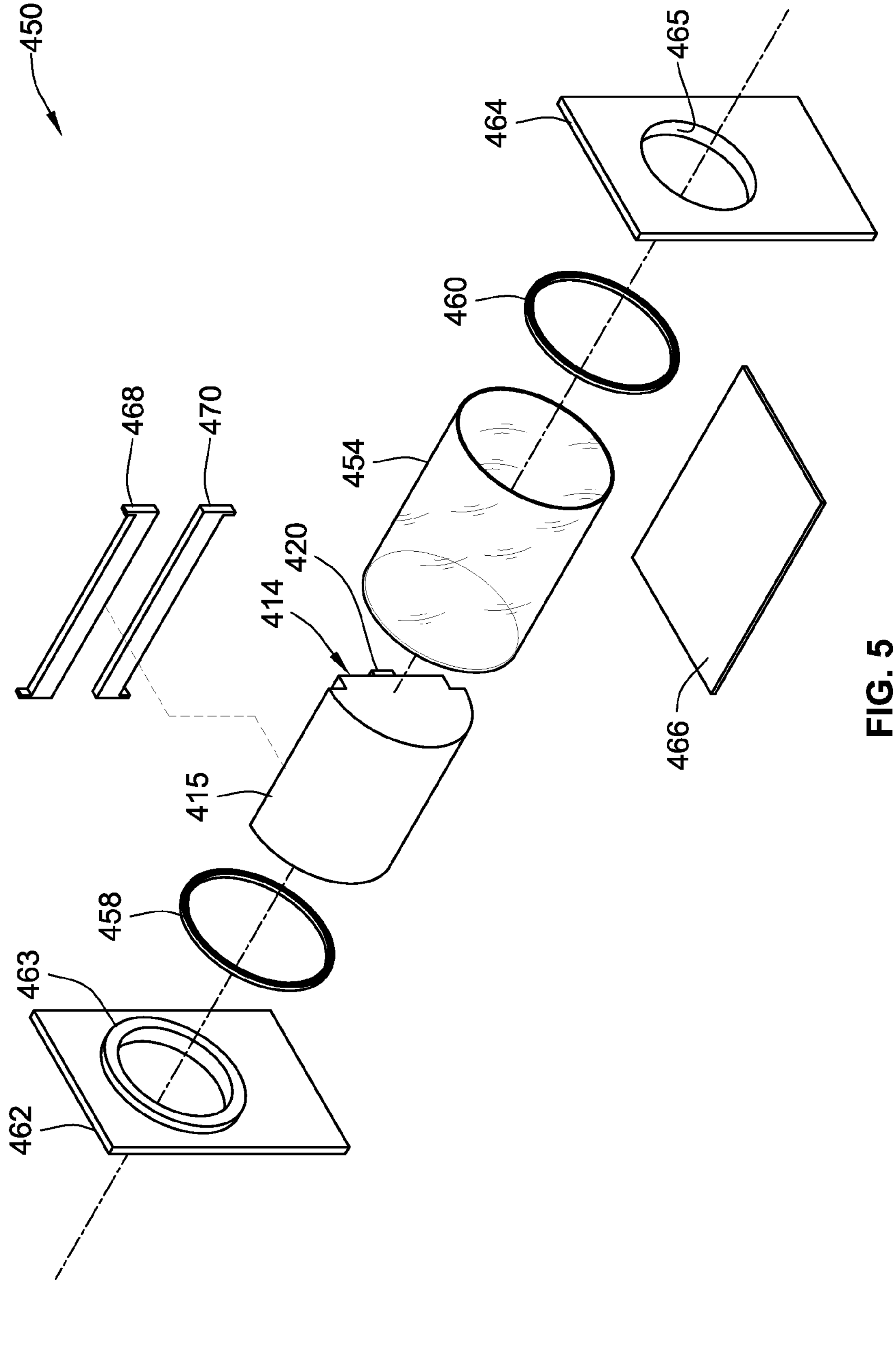
FIG. 5 is an exploded perspective-view illustration of the gaming display assembly of FIG. 4.

FIG. 5 is an exploded perspective-view illustration of the gaming display assembly 450. To support the display interface 454 independently from the primary display device 414, one or more axially aligned radial bearings rotatably couple the cylindrical tube of the manually rotatable display interface 454 to the support structure 413 of the housing 412. By way of non-limiting example, first and second needle roller bearings 458 and 460, respectively, are each coupled to a respective longitudinal end of the cylindrical tube of the manually rotatable display interface 454. In some embodiments, the bearings 458, 460 are one-way axial bearings, which may be in the nature of one-way needle bearings, one-way roller bearings, one-way sprag bearings, or other known one-way bearing assemblies.

The cylindrical tube 454 extends between and is generally orthogonally oriented with respect to first and second substantially parallel support plates 462 and 464, respectively. Each support plate 462, 464 has a circular rim 463 and 465, respectively, projecting from an inside surface of the plate 462, 464. The first axial bearing 458 and, thus, a first end of the cylindrical tube 454 is supported on the first circular rim 463 of the first support plate 462, whereas the second axial bearing 460 and, thus, a second end of the cylindrical tube 454 is supported on the second circular rim 465 of the second support plate 464. An optional base plate 466 rigidly mounts the support plates 462, 464 to the support structure 413 of the housing 412. For some arrangements, the support plates 462, 464 may be mounted directly to the support structure 413, thus eliminating the need for the base plate 466, while in some embodiments the axial bearings 458, 460 may be mounted directly to the support structure 413, thus eliminating the need for the support plates 462, 464. A pair of substantially parallel cross-beams 468 and 470 extends across the backside of the primary display device 414 mounting or otherwise coupling the primary display device 414 to the support plate 462, 464. The cross-beams 468, 470 rigidly mount the primary display device 414 inside the player-rotatable display interface 454. With this arrangement, the cylindrical tube of the manually rotatable display interface 454 can be concentrically aligned with the curved video display device 414.

In the embodiment of FIGS. 4 and 5, the optional touchscreen 415 is mounted to the gaming display assembly 450 such that it is positioned between the player-rotatable display interface 454 and the primary display device 414. With this arrangement, the touchscreen 415 can sense a player touching the manually rotatable display interface 415 through the rotatable display interface 415. For some embodiments, it may be desirable to mount the touchscreen 415 on the outer periphery of the primary display device 414, as seen in FIGS. 4 and 5. Alternatively the touchscreen 415 is mounted on the inner periphery or the outer periphery of the player-rotatable display interface 454. The touchscreen 415 can take on any known form, including capacitive touchscreens, surface acoustic wave (SAW) touchscreens, and infrared touchscreens as some non-limiting examples. For some implementations, the touchscreen 415 utilizes ZYTOUCH® projected capacitive technology (PCT) touch-sensitive flexible film, such as ZYFILM® and ZYPROFILM®, available from Zytronic PLC of London, England.

By using touchscreen capabilities in conjunction with the player-rotatable display interface, the gaming display assembly 450 can track both finger movement and interface movement. In so doing, the gaming display assembly 450 can offer additional player-interactive gaming features. For instance, a player can be allowed to independently move the individual reels 421-425, e.g., by tracking where the player places a finger or other appendage relative to reel array 421-425 before spinning the player-rotatable display interface 454. So, if the player presses his/her finger on the player-rotatable display interface 454 over the first reel 421, then proceeds to physically spin the display interface 454 by applying a downward force F1, the primary display device 414 will responsively depict the first reel 421 spinning. The player may then place his/her finger over the next four reels 422-425, one at a time, and sequentially re-spin the player-rotatable display interface 454 such that the primary display device 414 responsively initiates the spinning of the remaining reels 422-425. Touchscreen capabilities can also be employed to allow the player to select objects on the primary display device 414 and the player-rotatable display interface 545. For example, the gaming display assembly 450 may use frustrated total internal reflection (FTIR) touchscreen technology to allow the player to select objects, such as symbols and paylines, that are printed, formed or etched onto the surface of the player-rotatable display interface 454.

As indicated above, the rotational sensing device 456 tracks the rotational position, velocity and/or acceleration of the player-rotatable display interface 454. There are various known means by which the rotational sensing device 456 can monitor these characteristics. For example, the rotational sensing device 456 may include one or more optical sensors, rotational encoders, infrared cameras, rotational transducers, or combinations thereof, to track the rotational position, rotational velocity, and rotational acceleration/deceleration of the player-rotatable display interface 454. In some embodiments, a rotational encoder includes a wheel or shaft that is mechanically coupled to the periphery of display interface 454 for common rotation therewith. The rotational encoder converts the angular position and/or speed of the display interface 454, as tracked by the wheel/shaft, into an analog or digital signal. Alternatively, an optical sensor (e.g., photosensor) can be used to track unique symbols (e.g., dots, strips, numbers, etc.) that are etched or printed on the periphery of the display interface 545. Each of the unique symbols can be associated with a specific location on the circumference of the player-rotatable display interface 454 and, thus, can correspond to a specific rotational position. Increasing the frequency of these symbols will help to increase the accuracy of tracking offered by the optical sensor. Regardless of the technology used, it is generally preferred that any latency gaps between the movement of the minimize or eliminate (track movement down to millisecond).

Figure 6:
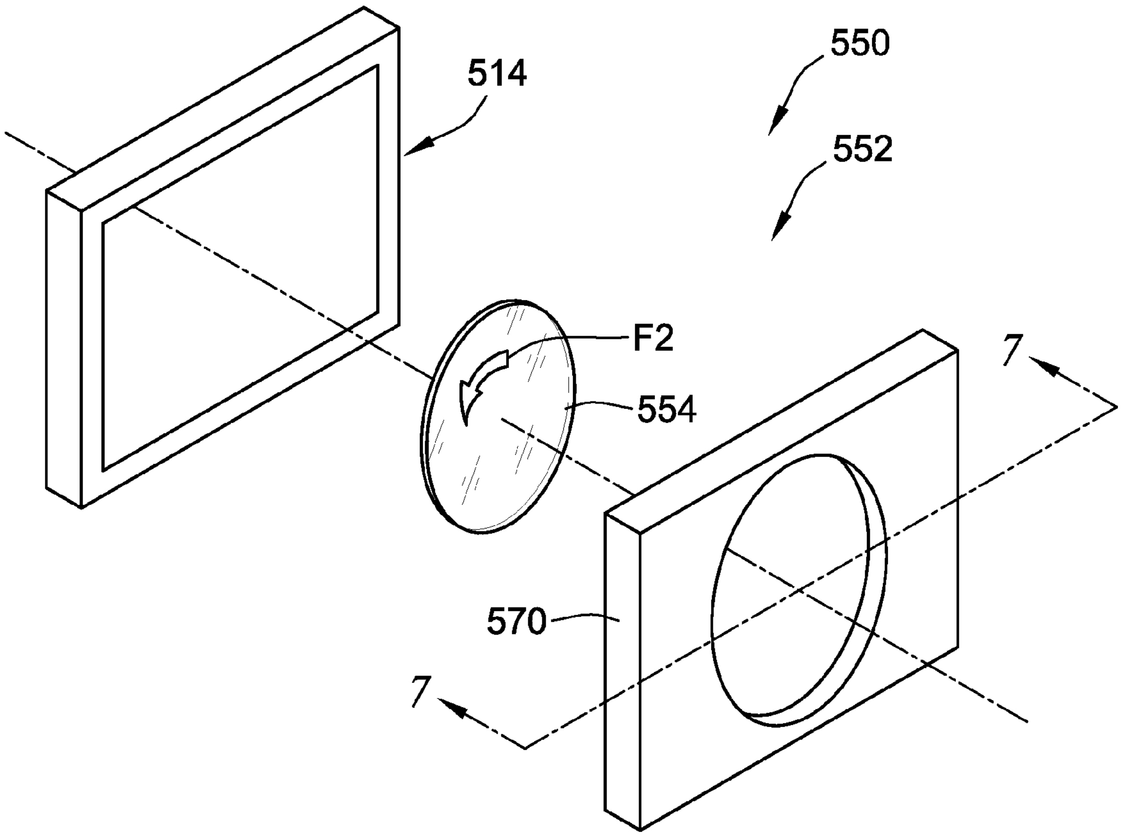
FIG. 6 is an exploded perspective-view illustration of another gaming display assembly with a player-rotatable display interface overlying a primary display device in accordance with aspects of the present disclosure.

Turning now to FIG. 6, there is provided an exploded perspective-view illustration of another gaming display assembly 550 with an interactive display interface device 552. The gaming display assembly 550 can be incorporated into any of the gaming terminals and systems disclosed or otherwise referenced herein, including the gaming terminal 10 of FIG. 1, the gaming system shown in FIG. 2, and the gaming machine 400 of FIG. 4. The display interface device 552 of FIG. 6 includes a manually rotatable display interface 554 (also referred to herein as "player-rotatable display interface") which overlies at least a portion of a primary display device 514. In this embodiment, the primary display device 514 comprises a flat-screen video display device, such as a high-definition LED, LCD, OLED or plasma display panel, which is rigidly mounted behind the player-rotatable display interface 554.

Figure 7:
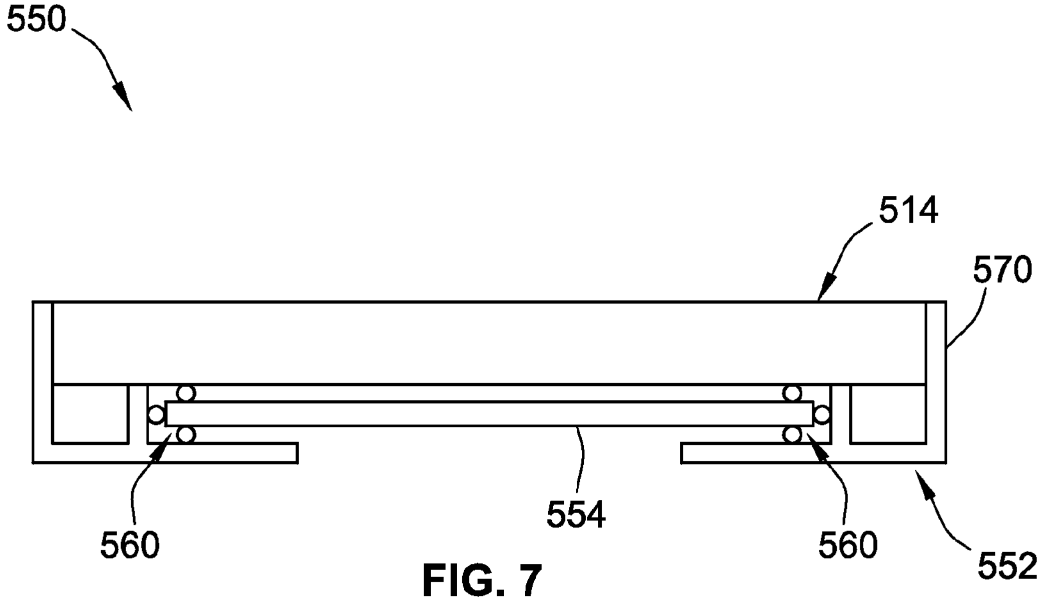
FIG. 7 is a side-view illustration of the gaming display assembly of FIG. 6 shown in partial cross-section.

The interactive display interface device 552, in at least some aspects of the disclosed concepts, offers players the perception that they are controlling aspects of wagering game displayed on the primary display device 514. In the illustrated example, the player-rotatable display interface 554 is a transparent or semi-transparent disk, which may be fabricated from a number different materials, including those discussed above with respect to the cylindrical tube of FIGS. 4 and 5, and provided in an assortment of different shapes, sizes and arrangements. The disk of the player-rotatable display interface 554 is rotatably mounted, e.g., via one or more bearings 560, at least partially inside a bezel 570. According to the illustrated embodiment, the disk 554 is circumscribed by the bezel 570 such that the outer periphery of the disk 554 is enclosed within the bezel 570 and the front face of the disk 554 is exposed by the bezel 570. To manually impart rotation to the disk 554, the player applies a force F2 (e.g., counterclockwise in FIG. 6) to the front face of the disk 554. Like the display interface device 452 of FIG. 4, the display interface device 552 of FIGS. 6 and 7 is operatively connected, e.g., directly or indirectly, wired or wirelessly, to the primary display device 514 such that the motion manually imparted to the player-rotatable display interface 554 affects one or more aspects of a wagering game displayed on the primary display device 514.

Figure 8:
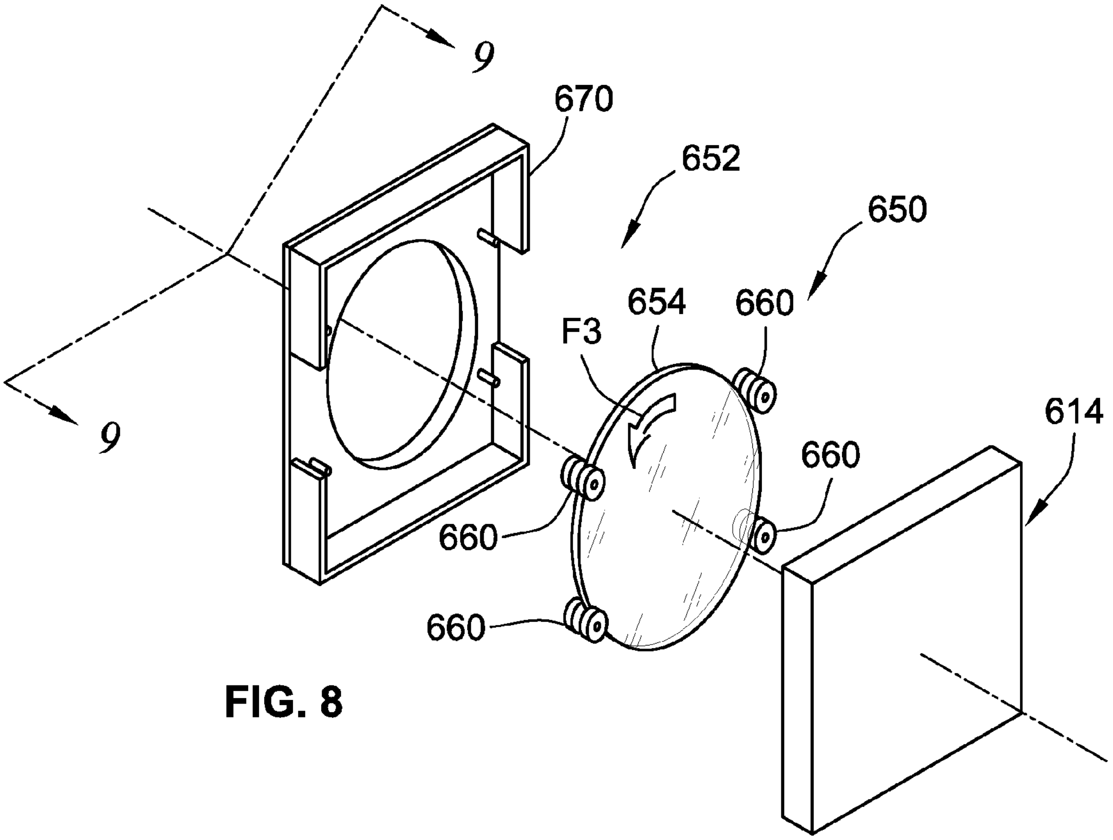
FIG. 8 is a front perspective-view illustration of yet another gaming display assembly with a player-rotatable display interface overlying a primary display device in accordance with aspects of the present disclosure.

FIG. 8 illustrates another gaming display assembly 650 with an interactive display interface device 652 in accordance with aspects of the present disclosure. Like the gaming display assembly 550 of FIGS. 6 and 7, the gaming display assembly 650 of FIG. 8 can be incorporated into any of the gaming terminals and systems disclosed or otherwise referenced herein, including the gaming terminal 10 of FIG. 1, the gaming system shown in FIG. 2, and the gaming machine 400 of FIG. 4. The display interface device 652 includes a manually rotatable display interface 654 (also referred to herein as "player-rotatable display interface") which overlies at least a portion of a primary display device 614. In this embodiment, the primary display device 614 comprises a flat-screen video display device, such as a high-definition LED, LCD, OLED or plasma display panel, which is rigidly mounted behind the player-rotatable display interface 654.

Figure 9:
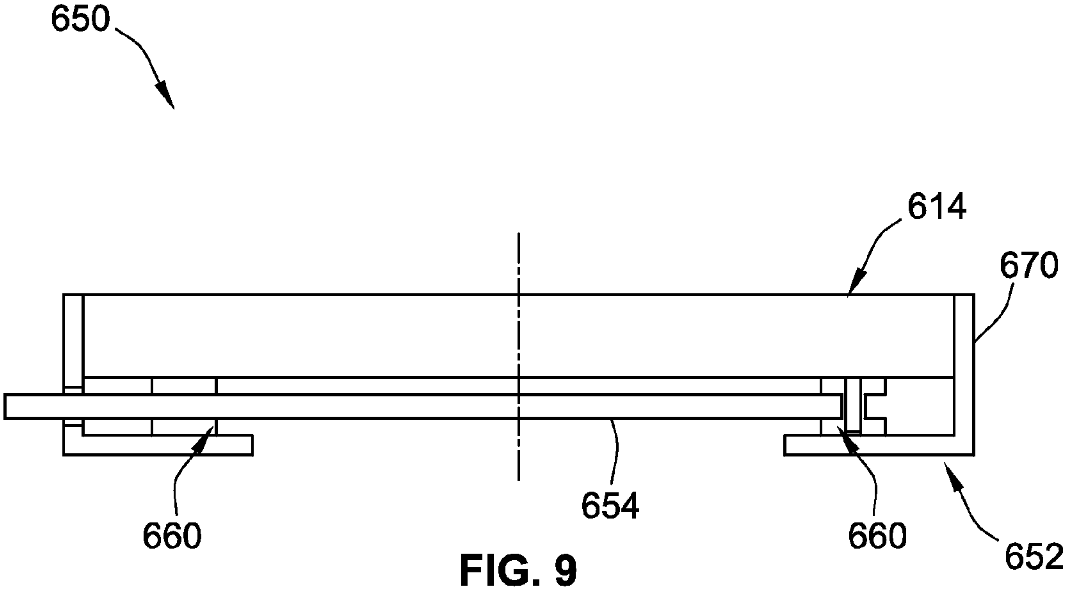
FIG. 9 is a side-view illustration of the gaming display assembly of FIG. 8 shown in partial cross-section.

The interactive display interface device 652, in at least some aspects of the disclosed concepts, offers players the perception that they are controlling aspects of a wagering game displayed on the primary display device 614. The player-rotatable display interface 554 of FIGS. 8 and 9 is a transparent or semi-transparent disk, which may be fabricated from a number different materials, including those discussed above with respect to the cylindrical tube of FIGS. 4 and 5, and provided in an assortment of different shapes, sizes and arrangements. The disk 654 is rotatably mounted at least partially inside a transparent or semi-transparent mounting frame 670 via one or more bearings 660. The front face of the disk 654 is substantially covered by the mounting frame while a portion of the outer periphery of the disk 654 is exposed by the mounting frame 670. To manually impart rotation to the disk 654, the player applies a force F3 (e.g., counterclockwise in FIG. 8) to the outer edge of the disk 654. Like the display interface device 452 of FIG. 4, the display interface device 652 of FIGS. 8 and 9 is operatively connected, e.g., directly or indirectly, wired or wirelessly, to the primary display device 614 such that the motion manually imparted to the player-rotatable display interface 654 affects one or more aspects of a wagering game displayed on the primary display device 614.

While many representative embodiments and exemplary modes for carrying out the present invention have been described in detail above, those familiar with the art to which this invention relates will recognize various alternative designs and embodiments for practicing the invention within the scope of the appended claims.

What is claimed is:

1. A gaming machine for playing a wagering game, the gaming machine comprising:

a support structure;

an input device configured to receive an input indicative of a wager to play the wagering game;

a primary display device configured to display a plurality of symbol-bearing reels with symbols arranged in an array to indicate a randomly determined outcome of the wagering game; and a display interface device including a player-rotatable display interface and a rotational sensing device, the player-rotatable display interface comprising a transparent or semi-transparent annulus or cylindrical tube rotatably mounted to the support structure with the primary display device disposed at least partially inside the annulus or cylindrical tube, the annulus or cylindrical tube being configured to be manually rotated by a player touching and moving the annulus or cylindrical tube, the rotational sensing device being configured to detect rotation of the annulus or cylindrical tube, wherein the display interface device is operatively connected to the primary display device such that motion manually imparted to the annulus or cylindrical tube by the player, as detected by the rotational sensing device, affects movement of one or more of the symbol-bearing reels displayed via the primary display device.

2. The gaming machine of claim 1, wherein the player-rotatable display interface comprises the transparent or semi-transparent cylindrical tube circumscribing the primary display device.

3. The gaming machine of claim 1, wherein the display interface device further includes one or more radial bearings rotatably coupling the annulus or cylindrical tube to the support structure.

4. The gaming machine of claim 3, wherein each of the one or more radial bearings is a one-way bearing.

5. The gaming machine of claim 3, wherein the display interface device further includes one or more support plates mounting the one or more radial bearings to the support structure.

6. The gaming machine of claim 5, wherein the display interface device further includes a base plate rigidly mounting the one or more support plates to the support structure.

7. The gaming machine of claim 1, further comprising one or more cross-beams mounting the primary display device at least partially inside the annulus or cylindrical tube of the player-rotatable display interface.

8. The gaming machine of claim 1, wherein the support structure is part of a cabinet, the player-rotatable display interface being at least partially enclosed within the cabinet.

9. The gaming machine of claim 1, wherein motion manually imparted to the annulus or cylindrical tube by the player initiates spinning of one or more of the symbol-bearing reels.

10. The gaming machine of claim 9, wherein the player stopping the motion of the annulus or cylindrical tube initiates stopping of one or more of the symbol-bearing reels.

11. The gaming machine of claim 1, wherein the player manually imparts motion to the annulus or cylindrical tube by applying a force to the front face of the annulus or cylindrical tube.

12. The gaming machine of claim 1, wherein the symbol-bearing reels are electro-mechanical reels rotatably mounted at least partially inside the annulus or cylindrical tube.

13. The gaming machine of claim 1, wherein the primary display device comprises a curved liquid crystal display (LCD) device or a curved organic light emitting diode (OLED) display device rigidly mounted at least partially inside the annulus or cylindrical tube.

14. The gaming machine of claim 1, wherein the primary display device comprises a flat-screen video display device mounted at least partially inside the annulus or cylindrical tube.

15. The gaming machine of claim 1, wherein the rotational sensing device includes an optical sensor, a rotational encoder, an infrared camera, or a rotational transducer, or a combination thereof, configured to track the rotational position, the rotational velocity, or the rotational acceleration, or a combination thereof, of the annulus or cylindrical tube.

16. The gaming machine of claim 1, further comprising a touchscreen input device mounted on the player-rotatable display interface or between the primary display device and the player-rotatable display interface.

17. A gaming system for playing a wagering game, the gaming system comprising:

one or more input devices;

one or more processors;

one or more memory devices;

a support structure;

a display device configured to display a plurality of symbol-bearing reels with symbols arranged in an array to indicate a randomly determined outcome of the wagering game; and a display interface device including a player-rotatable display interface and a rotational sensing device, the player-rotatable display interface comprising a transparent or semi-transparent annulus or cylindrical tube rotatably mounted to the support structure with the display device disposed at least partially inside the annulus or cylindrical tube, the annulus or cylindrical tube being configured to be manually rotated by a player touching and moving the annulus or cylindrical tube, the rotational sensing device being configured to detect rotation of the annulus or cylindrical tube, wherein the display interface device is operatively connected to the display device such that motion manually imparted to the annulus or cylindrical tube by the player, as detected by the rotational sensing device, affects movement of one or more of the symbol-bearing reels displayed via the display device.

18. A gaming display assembly comprising:

a mounting support;

a primary display device configured to display a plurality of symbol-bearing reels with symbols arranged in an array to indicate a randomly determined outcome of the wagering game; and a display interface device including a player-rotatable display interface and a rotational sensing device, the player-rotatable display interface comprising a transparent or semi-transparent annulus or cylindrical tube rotatably mounted to the mounting support with the primary display device disposed at least partially inside the annulus or cylindrical tube, the annulus or cylindrical tube being configured to be manually rotated by a player touching and moving the annulus or cylindrical tube, the rotational sensing device being configured to detect rotation of the annulus or cylindrical tube, wherein the display interface device is operatively connected to the primary display device such that motion manually imparted to the annulus or cylindrical tube by the player, as detected by the rotational sensing device, affects movement of one or more of the symbol-bearing reels displayed via the primary display device.

19. The gaming display assembly of claim 18, wherein the player-rotatable display interface comprises the transparent or semi-transparent cylindrical tube rotatably coupled to the mounting support via first and second axially aligned radial bearings each coupled to a respective longitudinal end of the cylindrical tube, the primary display device being mounted inside the cylindrical tube.

20. The gaming display assembly of claim 19, wherein the mounting support comprises first and second substantially parallel support plates each with a circular rim projecting therefrom, the first and second radial bearings being supported on the circular rims of the first and second support plates, respectively.

21. The gaming display assembly of claim 18, further comprising a touchscreen input device mounted on the player-rotatable display interface or between the primary display device and the player-rotatable display interface.

22. A wagering game terminal comprising:

a cabinet with support structure;

an input device configured to receive an indication of a wager to play a wagering game;

a curved liquid crystal display (LCD) or organic light emitting diode (OLED) video display device mounted to the support structure of the cabinet, the curved video display device being configured to display a plurality of symbol-bearing reels with symbols arranged in an array to indicate a randomly determined outcome of the wagering game; and a display interface device with a player-rotatable display interface including a cylindrical tube rotatably mounted to the support structure of the cabinet and configured to be manually rotated by a player touching and rotating the cylindrical tube, the curved video display device being mounted inside the cylindrical tube, the display interface device being operatively connected to the primary display device such that motion manually imparted to the cylindrical tube by the player affects the movement of one or more of the symbol-bearing reels displayed by the curved video display device.

* * * * *